United States Patent [19]

Merz

[11] 4,344,717
[45] Aug. 17, 1982

[54] MEANS FOR MUTUAL POSITIONING OF MEMBERS

[75] Inventor: Johann Merz, Bopfingen, Fed. Rep. of Germany

[73] Assignee: Zahnradfabrik Friedrichshafen, AG., Friedrichshafen, Fed. Rep. of Germany

[21] Appl. No.: 259,418

[22] Filed: May 1, 1981

[30] Foreign Application Priority Data

May 16, 1980 [DE] Fed. Rep. of Germany ....... 3018651

[51] Int. Cl.³ .............................................. F16B 17/00
[52] U.S. Cl. ........................................ 403/14; 418/82
[58] Field of Search .................. 418/82, 270; 403/13, 403/14; 164/132

[56] References Cited

U.S. PATENT DOCUMENTS

| | | | |
|---|---|---|---|
| 3,200,752 | 8/1965 | Clark et al. | 417/300 |
| 3,549,288 | 12/1970 | Nichols et al. | 418/82 X |
| 3,973,881 | 8/1976 | Melchinger | 418/82 X |
| 4,010,794 | 3/1977 | Einhorn | 164/132 X |

*Primary Examiner*—Andrew V. Kundrat
*Attorney, Agent, or Firm*—Zalkind & Shuster

[57] ABSTRACT

In the manufacture of vane type pumps, particularly for booster steering systems, precision assembly between the flow directing plate, sometimes referred to as a cheek plate, control plate, etc., and the cam ring is provided economically by die casting either or both components and effecting a pair of die cast tapering flat sided locating bores. One bore is elongated to allow for inaccuracies while the other is box-like in cross section. Locator pins secured in reamed bores are force fitted into the cast bores wherein the box-like bore which is dimensioned to fit a pin determines the rotational center of the components with respect to each other for exact relative positioning. The position is fixed by a pin in the elongated bore which pin can be accommodated in the elongation to compensate for spacing errors of the bores.

5 Claims, 3 Drawing Figures

MEANS FOR MUTUAL POSITIONING OF MEMBERS

Prior art arrangements or means for assembling a pair of plates such as the cam ring and the flow directing plate in a vane pump have been relatively expensive in that reamed bores for locator pins have been utilized or reamed bores with an elongated hole for one such bore have been utilized wherein the formation of the elongated socket would be by drilling and reaming or sintering, and the reamed bores by way of drilling and reaming. For example, the patent to Clark et al, U.S. Pat. No. 3,200,752, of Aug. 17, 1965 shows (FIG. 4) two locator pins carried in reamed bores of the assembly components while the other is carried in a reamed bore of one component and an elongated socket of the other component.

The present invention illustrates the concept of die casting one of the components, locator bores being die cast therewith thereby eliminating the need for at least one of the reamed bores as well as the need for the extra work involved in providing an elongated bore. The arrangement provides an accurate assembly between two components where precision positioning is necessary, particularly as between the flow directing plate and the cam ring of a vane pump, as will be understood by persons skilled in the art. The method of thus producing precision assembly is simple and economical.

One particular feature of the invention resides in the fact that the die cast bores, one of which is die cast elongated in the direction towards the other bore are formed with flat sides, the other bore being of square cross section. Both bores are tapered so as to provide easy assembly and force fit. The elongated bore has a pair of flat sides tapered toward each other in planes oriented in the direction of the other bore.

Accordingly, it will be appreciated that a pair of locator pins carrned in reamed bores of one member can be inserted into respective bores with a force fit. The pin going into the square sided bore effects the axis about which the two members can swing in order to come into perfect alignment secured in such position by the other pin. Such other pin, having radial play in the elongated flat sided bore can thus be fitted into such bore within the confines thereof at some point to allow for casting or machining distance errors between the reamed bores of the one component and/or between the bores cast in the other component.

A further feature of the invention resides in the fact that the bore configuration, being flat sided and tapered, ready removability from the casting mold is achieved.

A still further feature of the invention is the fact that the bores having flat sides for round pins, space is provided for metal extruded by force fitting of the pins in the bores. Enlarged recesses at the bore openings also provide for any extrusion of metal.

A detailed description of the invention now follows in conjunction with the appended drawing in which FIG. 1 is a plan view of a die cast member having bores for receiving locator pins taken on line I—I of FIG. 2.

Figure 1:
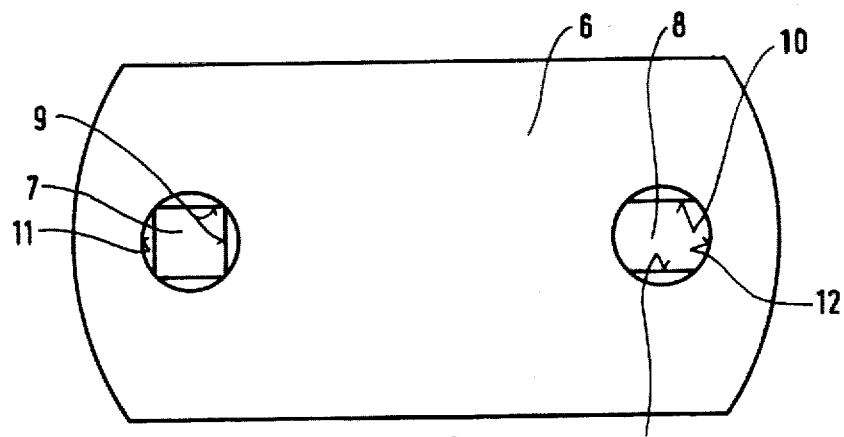

Referring to the drawing, a plate member 1 is provided with a pair of spaced reamed member bores 2 and 3. Member locator pins 4 and 5 are secured in respective bores 2 and 3. Another plate member 6 is die cast with two spaced member bores 7 and 8 spaced to a distance equal to that between the bores 2 and 3 but with a large tolerance. The bores 7 and 8 need no further work after being produced by die casting and are tapered inwardly as shown. Bore 7 is box-like in cross section, preferably square as shown with four planar sides 9 narrowing inwardly. The bore 8 has two planar parallel flat surfaces 10 which effect a bore elongated in the direction between the two bores, as shown. The entrance openings to the bores 7 and 8 are cast with short circular respective recesses 11 and 12 which can accommodate material that may be extruded from the sides of the bores as the locator pins are forced thereinto, corner spaces for extrusion also being had by the round pins being forced into flat sided bores.

The square bore 7 can be considered as the center about which the two members can pivot with respect to each other so that they can be fixed exactly in position for proper flow passage, for example, of a pressure fluid from a vaned pump rotor within a cam ring to an outlet passage within a flow directing plate. Due to the elongation of the bore 8, the large tolerance existing in the manufacture of the separate parts insofar as bores are concerned is adjusted for, since the pin 5 can take a position within elongated bore 8 at some point which effects a distance automatically corrected for distance errors and large tolerances.

The side length of the square socket corresponds approximately to the diameter of the locating pin 4, whereas the distance between the parallel sides 10 corresponds approximately to the diameter of the locator pin 5. The force fit of the locator pins into the tapering sockets ensures connection of the members without play and a simple assembly. Where there is material flow in the course of force fitting, displaced material from the socket 7 can flow to the corners of the bore and thence to the recess 11, whereas displaced material from the bore 8 can flow to the clear spaces at the ends of the flat sides and thence to the recess 12.

Figure 2:
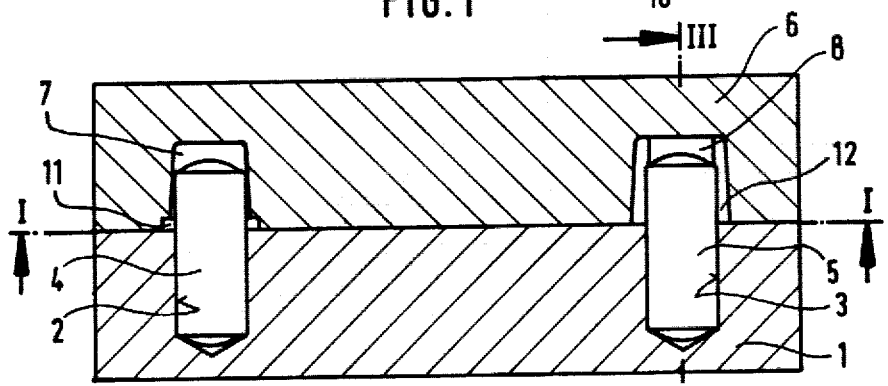
FIG. 2 is a section through a pair of joined members.
Figure 3:
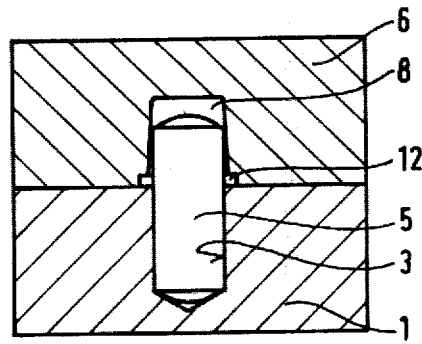
FIG. 3 is a section on line III—III of FIG. 2.

It will, of course, be understood that the concept of the invention can be utilized in a manner such that both members are die cast with one reamed bore and one flat sided bore in each member. Thus, considering FIG. 2 and both members being die cast, reamed bore 2 and socket 7 would be as shown, whereas at the other side of the assembly the reamed bore 3 would be in the member 6 with the flat sided bore 8 within the member 1.

What is claimed is:

1. Means for positioning a pair of members relative to each other wherein said members have reamed bores to receive locator pins to extend therebetween and having an elongated bore to compensate for misalignment of said members when being positioned;

the improvement which comprises:

one of said members having die cast therein a box-like bore having a plurality of sides configured to receive an end of a locator pin the other end of which is to be received in a reamed bore, said box-like bore being tapered and having open corners to receive metal extruded as a locator pin is force fitted thereinto, and the elongated bore being likewise die cast, both said latter bores being tapered to provide ready access for entry of locator pins to be force fitted.

2. Means as set forth in claim 1, including a recess at the locator pin entry openings of said box-like bore and said elongated bore to receive excess metal extruded during force fit entry of locator pins.

3. Means as set forth in claim 1, wherein said elongated bore and said box-like bore are in one member and said reamed bores are in the other member.

4. Means as set forth in claim 1, wherein said box-like bore has flat sides.

5. Means as set forth in claim 4, wherein said box-like bore is square.

* * * * *